(12) United States Patent
Ito

(10) Patent No.: US 6,347,278 B2
(45) Date of Patent: Feb. 12, 2002

(54) MOBILE TERMINAL AND A SERVER FOR NAVIGATION SYSTEM

(75) Inventor: Takashi Ito, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/768,255

(22) Filed: Jan. 25, 2001

Related U.S. Application Data

(63) Continuation of application No. PCT/JP99/03325, filed on Jun. 22, 1999.

(51) Int. Cl.[7] .............................................. G01C 21/00
(52) U.S. Cl. ...................... 701/200; 701/201; 701/208; 701/24; 701/25; 340/988; 342/357.08; 342/357.1
(58) Field of Search ............................... 701/200, 201, 701/208, 117, 118, 119, 25, 24; 340/988; 342/357.01, 357.08, 357.09, 357.1

(56) References Cited

U.S. PATENT DOCUMENTS

| | | | |
|---|---|---|---|
| 4,812,843 A | * | 3/1989 | Champion, III et al. .... 340/905 |
| 6,073,076 A | * | 6/2000 | Crowley et al. ............ 701/208 |
| 6,173,277 B1 | * | 1/2001 | Ashby et al. ................... 701/1 |

FOREIGN PATENT DOCUMENTS

| | | |
|---|---|---|
| JP | A7320196 | 12/1995 |
| JP | A1096644 | 4/1998 |
| JP | A10505420 | 5/1998 |
| JP | A10300499 | 11/1998 |
| JP | A1151669 | 2/1999 |
| WO | A1-9221001 | 11/1992 |

* cited by examiner

*Primary Examiner*—Yonel Beaulieu

(57) ABSTRACT

A navigation system in which a mobile terminal side 101 is not equipped with a CD-ROM for storing map database 105, but implements an on-demand navigation function by sharing the one provided within a server 102. By limiting the communications between the mobile terminal 101 and the server 102 only to the beginning of the route guidance and the moment at which the mobile terminal has deviated from the route, the communication traffic can be reduced, minimizing thereby the communication cost and the total power consumption as a whole, and further even when the mobile terminal 101 has deviated from the guide route, the system can readily provide the user with information by which he can reach his destination through communications with the server, and enabling also an indication of the name of the road to be taken at every crossings.

16 Claims, 11 Drawing Sheets

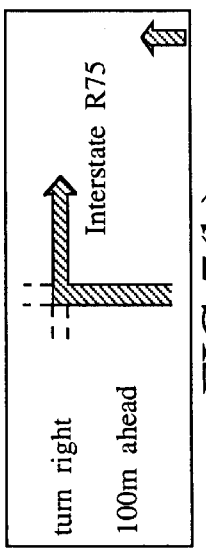

FIG.7(i)

go ahead

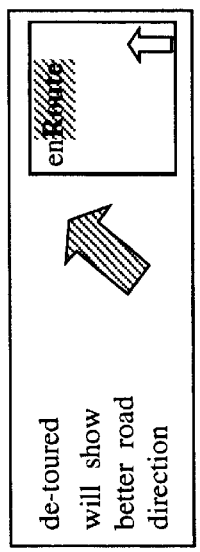

FIG.7(j)

turn right
100m ahead

Interstate R75

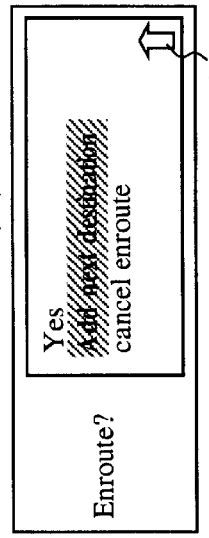

FIG.7(k)

de-toured
will show
better road
direction

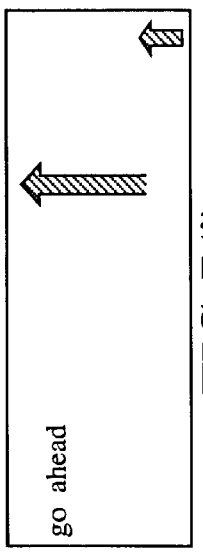

FIG.7(e)

destination
setting
Select
City / County

| Delta |
| Delton |
| Detroit |
| Dexter |

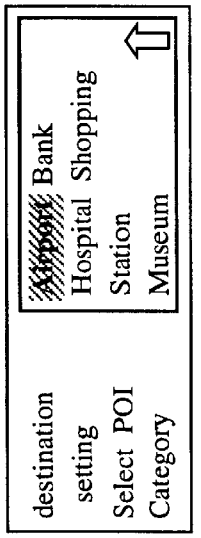

FIG.7(f)

destination
setting
Select POI
Category

| Airport | Bank |
| Hospital | Shopping |
| Station | |
| Museum | |

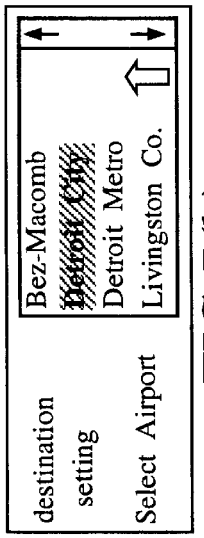

FIG.7(g)

destination
setting
Select Airport

| Bez-Macomb | |
| Detroit City | |
| Detroit Metro | |
| Livingston Co. | |

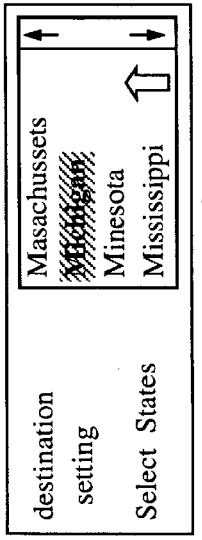

FIG.7(h)

Enroute?

| Yes |
| Add next destination |
| cancel enroute |

Function

| Enroute |
| Audio |

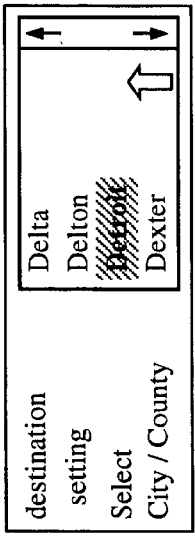

FIG.7(b)

destination
setting
Select States

| A B C D E F G H I |
| J K L M N O P Q R |
| S T U V W X Y Z |

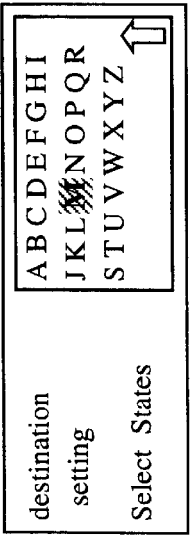

FIG.7(c)

destination
setting
Select States

| Masachussets |
| Michigan |
| Minesota |
| Mississippi |

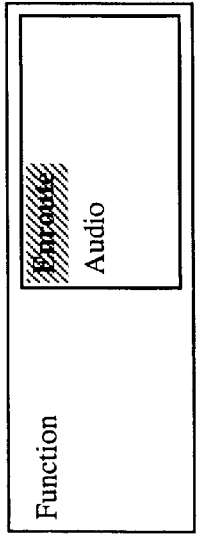

FIG.7(d)

destination
setting
Select City
in Michigan

| A B C D E F G H I |
| J K L M N O P Q R |
| S T U V W X Y Z |

MOBILE TERMINAL AND A SERVER FOR NAVIGATION SYSTEM

CROSS-REFERENCE TO THE RELATED APPLICATION

This Application is a continuation of International Application No. PCT/JP99/03325, whose international filing date is Jun. 22, 1999, the disclosures of which Application is incorporated by reference herein.

BACKGROUND OF THE INVENTION

1. Field of the Invention

The present invention relates to a mobile terminal and a server in a navigation system for providing a vehicle with a travel route guidance, and more particularly to a mobile terminal and a server provided in a navigation system, in which the navigation function can be attained by use of an on-demand system through communications between the mobile terminal which is not equipped with a map database, and a server which is equipped with a map database.

2. Description of the Related Art

Conventionally, there have been disclosed various navigation systems of this kind so far, a case in point being the one disclosed in Japanese National Publication of the translated version No. 10-505420.

FIG. 1 is a schematic diagram showing the configuration of a conventional navigation system as disclosed in the above-mentioned National Publication. In the figure, numeral 1 denotes one of a number of mobile parts, numeral 2 denotes a fixed part, and numeral 3 denotes a cellular telephone network by which the fixed part 1 and the mobile part 2 are mutually connected to each other.

In the mobile part 1, numeral 10 denotes a mobile telephone such as a hand-free cellular telephone, numeral 11 denotes an audio output, 12 denotes an audio input, and 13 denotes a radio antenna. Numeral 14 denotes a DTMF (Dual-Tone Multi-Frequency) decoder for translating DTMF signals, numeral 15 denotes a GPS (Global-Positioning System) satellite receiver for obtaining the geographical position of the mobile part 1 within which the GPS receiver itself is provided, 16 denotes a DTMF encoder for encoding signals into DTMF signals, 17 denotes an interface controller for receiving signals from the DTMF decoder 14 and the GPS receiver 15, and also feeding signals to the DTMF encoder 16, numeral 18 denotes a loudspeaker for allowing the telephone 10 to be used for speech, and numeral 19 denotes a microphone used for the same purpose.

In the fixed part 2, numeral 20 denotes a DTMF decoder, 21 denotes a DTMF encoder, and 22 denotes an interface controller. Further, numeral 23 denotes a computer connected to the cellular telephone network 3 by way of the DTMF decoder 20 and the DTMF encoder 21, and also by way of the interface 22, and numeral 24 denote a number of servers configuring the computer 23. Numeral 25 denotes a geographical database accessed by each of these servers 24, numeral 26 denotes a database of messages, 27 denotes an input for updating the geographical database 25, and numeral 28 denotes voice messages generated by the computer 23 and transmitted to the cellular telephone network 3.

The operation of the conventional device is now explained as below.

Here, each one of the servers 24 within the computer 23 is allocated to each of the active mobile parts 1 by way of the cellular telephone network 3. The mobile part 1 obtains location information using the GPS receiver 15, and transmits the thus obtained information to the fixed part 2 together with a request for directions to a specified destination. In the fixed part 2, the corresponding server 24 relates the location information to its geographical database 25, obtains message information associated with the location from the message database 26, and transmits the information back to the mobile part 1.

The computer 23 may transmit messages in DTMF code, using the DTMF encoder 21, or it may generate voice messages which are transmitted through a voice output 28 to the cellular telephone network.

When the position of a vehicle (namely the position of the mobile part 1) is transmitted to the computer 23 by use of the DTMF signals, the computer 23 can provide a vehicle or a third person requesting it with information or route guidance.

First of all, at the start of journey, the driver of a vehicle in which the mobile part 1 is mounted requests a service by activating a predialled control on the mobile telephone 10. This service request is transmitted to the interface controller 22 in the fixed part 2 over the cellular telephone network 3. The interface controller 22 then allocates a free server 24 to answer the call and interrogate the GPS receiver 15 of the mobile section 1 to determine its geographical position. The longitude and latitude data values output from the GPS receiver 15 are translated into DTMF tone-pairs by the DTMF encoder 16 of the mobile 1.

The mobile telephone 10 couples this audio signal into its speech input path of the audio input 12, and the DTMF decoder 14 coupled to the loudspeaker 18 decodes the supervisory data in DTMF format coming back from the corresponding server 24 of the fixed part 2 to acknowledge the reception of location messages.

Further, the computer 23 in the fixed part 2, on one hand, can call the mobile part 1 which automatically answers to this call, and then provide its location using the DTMF signaling system, or on the other hand, can receive a call from the mobile part 1, which could include the DTMF encoded identity of the mobile part 1, and would also provide the vehicle location using the interface controller 17.

The server 24 then captures the geographical database 25 on the basis of the current position of the user, and identifies the area within which that current position falls. The server 24 also captures any permanent user-specific information such as the type of vehicle, which may be relevant for the route to be selected, for example, because of height or weight restrictions. The user may encode those requirements for current data, which are not permanent, but are specific to the present information request (in particular his destination) using the telephone keyboard of the mobile telephone 10 in respect to voice prompts. Note that in a preferred embodiment, however, the call is presented to a human operator for the capture of this data, and this allows the user to obtain assistance in identifying his desired destination to the system, and also allows to speak his requirements, keeping his eyes and hands free for driving.

The operator then remotely programs the interface controller 17 in the mobile part 1 with system data identifying the vehicle destination, for use in subsequent data update processes, and instigates the generation of the voice-given directions and instructions to the driver by a speech generation subsystem of the computer server 24 of the fixed part 2.

Position fixes may be performed at regular intervals such as every 2 minutes, or every kilometers. Alternatively, the fixed part 2 may request the mobile part 1 to send its next position after a specified interval or distance.

When the driver is following the route, further instructions can be sent automatically as the driver enters each new area, the driver can be alerted if the route has been left or if any new traffic problems have been detected that will affect the individual driver.

This system is arranged such that when this system locates a mobile part entering an area having a message defined for it, for example, the next turn instruction (or an error message in the case where the mobile part 1 has gone off the selected route), that message is transmitted. This system may also be arranged to transmit messages to users other than the mobile part 1 in question, for example, to monitor the progress of valuable cargoes.

In the conventional navigation system as configured above, the mobile terminal (mobile part 1) is a device for timely providing a user with the information required for him to reach his destination by informing the location information of himself at least in each area to the server 24 of the fixed part 2, so that even in the case where no new information from the server 24 is required, each time he enters a new area, communications for obtaining necessary information for reaching the destination are performed, resulting in an increase in the total communication traffic.

Further, nothing about improving the method for a user to inform his destination to the server 24 of the fixed part 2 is talked about.

Note that the navigation system, in which a mobile terminal is not equipped with a map database but can carry out the navigation function by obtaining the map database through communications, is also disclosed in another document, namely Japanese Patent Application No. 7-320196 and the like. The navigation system in this document is the one that the location information obtained through the GPS received in the mobile terminal side is transmitted to the center (server) by way of a PHP terminal, and the center sends back the map data and traffic information based on the location information.

However, in this document, although the method for downloading the map data and the traffic information by way of a PHP terminal at the mobile terminal side is disclosed, neither concrete procedures for the downloading operation nor the way they are used is explained at all.

Accordingly, the present invention has been proposed to solve the problems aforementioned, and it is an object of the present invention to provide a navigation system which is capable of suppressing the frequency of communications between a mobile terminal and a server into a minimum level, and carrying out the navigation function using an on-demand system, wherein the mobile terminal is not equipped with any map database.

SUMMARY OF THE INVENTION

The present invention relates to a mobile terminal in a navigation system, which comprises a receiving means for receiving a first or a second recommendable travelling route data transmitted by way of a communication line, a location detection means for detecting the location of the mobile terminal itself, a comparing means for comparing the first or second recommendable travelling route data with a location detected by the location detection means, an indication means for indicating a direction to which the user should move on the basis of the result of the comparison made by the comparing means, and a new route requesting means for transmitting a request for a new second recommendable travelling route data to the communication line on the basis of the result of the comparison. Due to this construction, an on-demand navigation function with minimum frequency of communications is made possible.

The mobile terminal according to the present invention further comprises a transmission means for transmitting the location information and the destination information of itself to the communication line as a first condition. Due to this construction, setting of several points by way of which it travels is also made possible.

The mobile terminal according to the present invention further comprises a return indication means, which, in the case where a deviation of its location from the recommendable travelling route is detected on the basis of the result of the comparison executed in the comparing means, indicates the direction in which the nearest recommendable travelling route resides to the user. Due to this construction, returning to the guide route is made possible.

The mobile terminal according to the present invention comprises a return indication means, which, in the case where a deviation of its location from the recommendable travelling route is detected on the basis of the result of the comparison conducted in the comparing means, indicates the direction reverse to the recommendable traveling route after the deviation to the user. Due to this construction, returning to the guide route is made easier.

The mobile terminal according to the present invention further comprises a storage means for storing the data received through the communication line, a processing means for sequentially processing the data received through said communication line, a memory monitoring means for monitoring as to whether or not the summed amount of the memory area which has been made available after the completion of processing conducted by the processing means and unused memory area is substantially great, and a continued data requesting means, which, in the case where the result of the monitoring is substantially great and it is indicated that the received data contains a continued data, transmits a request for transmission of the continued data to the communication line. Due to this construction, an overflow of the memory can be automatically prevented.

The mobile terminal according to the present invention further comprises a data amount informing means for transmitting a notification of the amount of data storable in the memory to the communication line, in advance of receiving data by way of the communication line. Due to this construction, an overflow of the memory can be automatically prevented.

The mobile terminal according to the present invention further comprises an interruption requesting means, which, in the case where the result of the monitoring conducted by the memory monitoring means has become small during the data reception by way of the communication line, transmits a request for interruption of the data transmission to the communication line. Due to this construction, an overflow of the memory can be automatically prevented.

The present invention relates to a server in a navigation system, which comprises a request receiving means for receiving the starting point information and the destination information transmitted by way of the communication line as a condition, a route extracting means for extracting a recommendable travelling route in accordance with the condition received by the request receiving means, a transmission means for transmitting the recommendable travelling route by way of the communication line, and a destination setting information transmission means for transmitting destination setting information to the mobile terminal sequentially in the order of upper to lower layers, in response to the request received by way of the communication line. Due to this construction, the memory capacity required for setting of the destination can be made small.

The server according to the present invention further comprises a condition receiving means for receiving the condition for data transmission and a data-storage use memory amount information, both transmitted through the communication line, a processing means for carrying out processing on the basis of the condition for data transmission, a transmission means for transmitting the result of the processing conducted by the processing means, a data amount limiting means for limiting the amount of data to the level below the data storage-use memory amount information, and a continued information adding means for adding the information indicating that there exists continued data to the data to be transmitted to the communication line. Due to this construction, an overflow of the memory at the mobile terminal side can be automatically prevented.

BRIEF DESCRIPTION OF THE DRAWINGS

FIG. 7 is an illustration showing the variation of images displayed on the monitor of the navigation system in its operating mode.

DETAILED DESCRIPTION OF THE PREFERRED EMBODIMENTS

Several embodiments for carrying out best the present invention are now explained with reference to attached drawings, in order to explain the present invention to details.

[First Embodiment]

Figure 1:
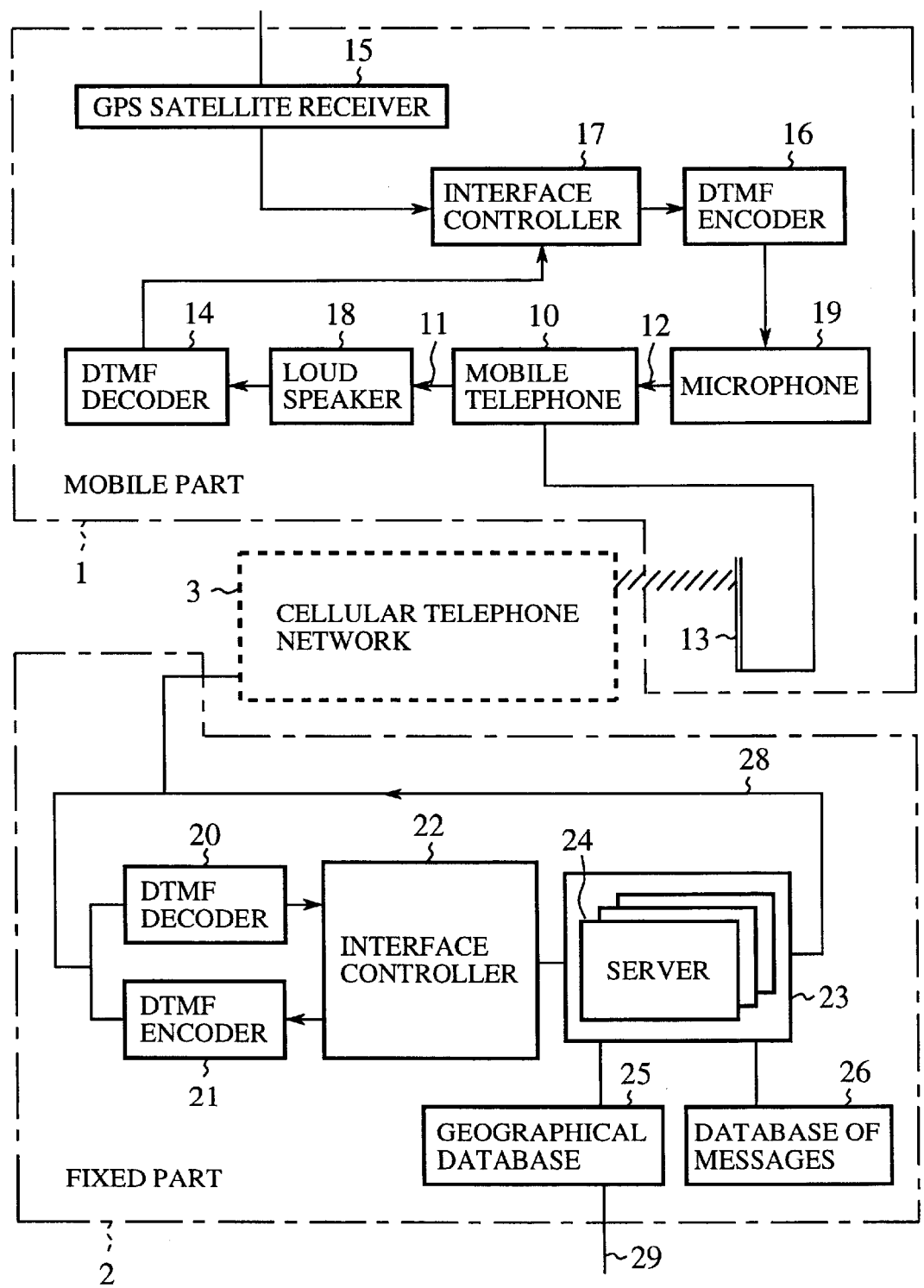
FIG. 1 is a schematic diagram showing the system configuration of a conventional navigation system.
Figure 2:
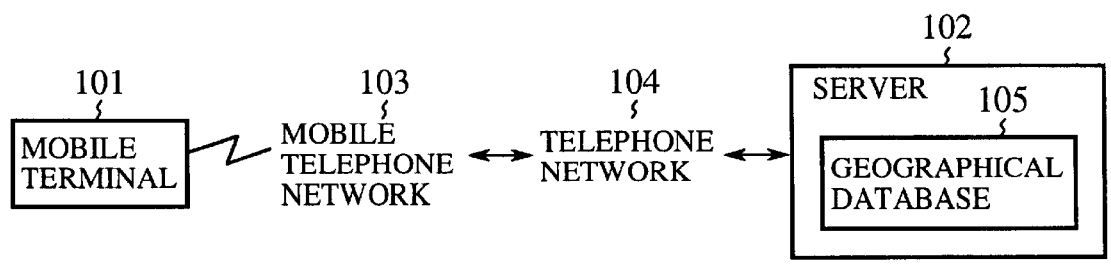
FIG. 2 is a schematic diagram showing the whole construction of the navigation system according to the present invention.

The navigation system according to the present invention is provided with, as its entire system configuration shown in FIG. 2, a mobile terminal 101 provided in a vehicle and a server 102 provided in the communication center. The mobile terminal 101 is connected to the server 102 by way of a mobile telephone network 103 and a fixed telephone network 104 such as a wire telephone network or the like, so that data communications are made possible. The server 102 is provided with a map database 105 such as a CD-ROM in which map data are stored.

Figure 3:
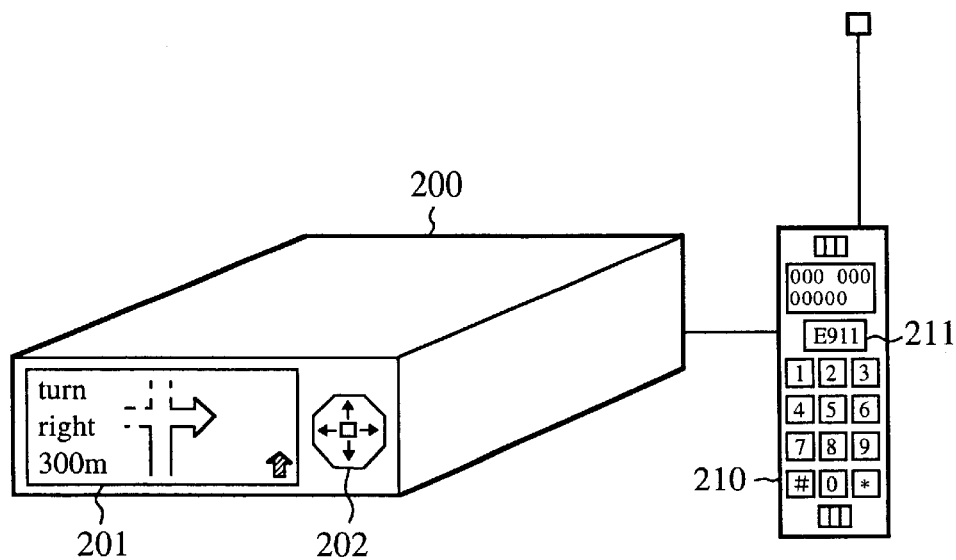
FIG. 3 is an illustration showing the general view of a mobile terminal configuring the navigation system of FIG. 2.

Note that, as its general view is shown in FIG. 3, the mobile terminal 101 is configured by a vehicle-mounted type information terminal 200 and a portable telephone 210, wherein the portable telephone 210 is connected to the terminal 200 and carries out data communications with the server 102 by way of the mobile telephone network 103 and the telephone network 104, and is provided with a function of detecting its position by receiving a signal from the GPS satellite. Reference numeral 201 within the vehicle-mounted type information terminal 200 is a monitor device such as an LCD monitor, and numeral 202 denotes an operation switch.

Here, in the case where there is a cursor observe d in the screen of the monitor device 201, by depressing the arrows (↑, →, ↓, ←) indicated on the operation switches, the cursor is shifted in the direction specified by the thus depressed arrows sequentially from one effective point to another in the screen, and by depressing the center portion of the operation button 202 (the portion indicated by □) after the cursor has reached a desired point, the position of the cursor is made effective, and the operation goes to the next procedure. Further, reference numeral 211 within the portable telephone 210 is an operation button to be used in an emergency case, wherein by depressing this operation button 211, the information indicating the fact that this is an emergency case and its location information are automatically transmitted to a predetermined emergency center or the like.

Figure 4:
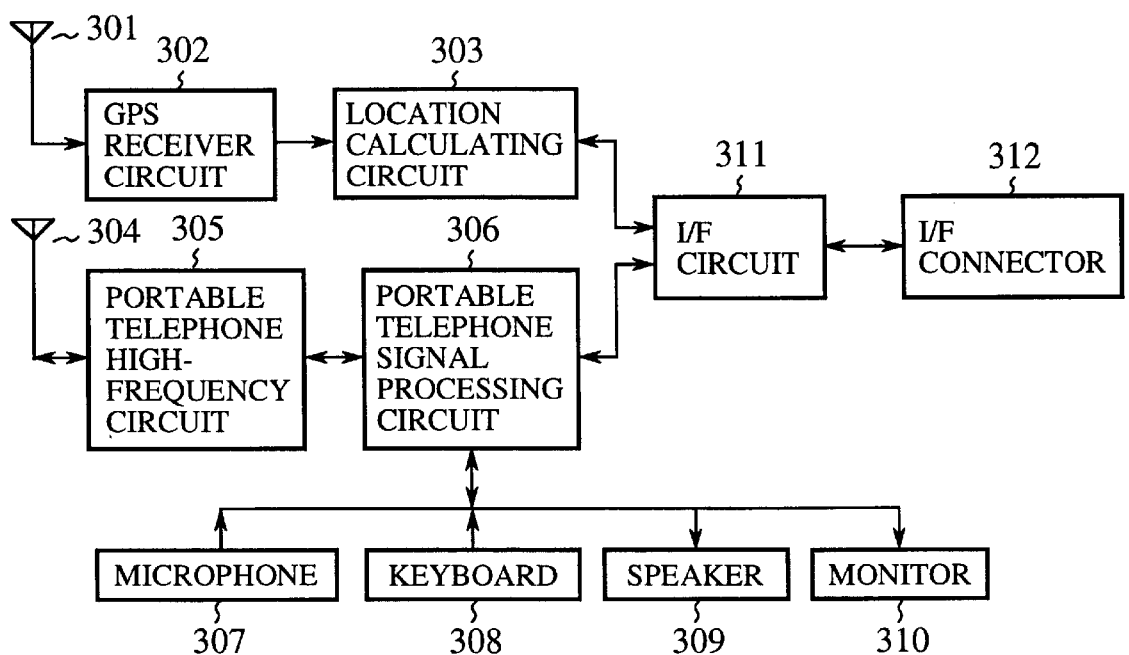
FIG. 4 is a schematic diagram showing the inner construction of a portable telephone within the mobile terminal.

Next, the detailed inner construction of the portable telephone 210 is shown in FIG. 4. In the figure, numeral 301 denotes an antenna, 302 denotes a GPS receiver circuit, and 303 denotes a location calculating circuit, wherein a signal transmitted from the GPS satellite is received by the antenna 301 as an electric signal, and the location information received through the antenna 301 is obtained as its latitude and longitude by these GPS receiver circuit 302 and the location calculating circuit 303. Obtaining the location information by use of these antenna 301, the GPS receiver circuit 302 and the location calculating circuit 303 corresponds to the "location detection means" in each of the claims.

Numeral 304 denotes an antenna used for transmission and/or reception of radio waves in normal portable telephones, 305 denotes a portable telephone high-frequency circuit for processing high-frequency signals, and numeral 306 denotes a portable telephone signal processing circuit for processing audio and digital signals. Numeral 307 denotes a microphone for inputting human voice to be transmitted, numeral 308 denotes a keyboard for use in telephone dialing and so on, 309 denotes a speaker for outputting received human voice, and numeral 310 denotes a monitor device for displaying inputs to the keyboard 308 or the like. By these elements, the function as a normal portable telephone is provided.

Further, numeral 311 denotes an interface circuit (hereinafter referred to just as an "I/F circuit"), numeral 312 denotes an I/F connector. This I/F circuit 311 obtains the location information from the location calculating circuit 303, when the user transmits his location information by depressing the operation button 211 or the like as shown in FIG. 3, and transmits it to the portable telephone signal processing circuit 306. Further the I/F circuit 311 transmits information also in the case where it receives a request for transmission of the location information from an external personal computer or the like (not shown) by way of the I/F connector 312, and it also adjusts matching of the personal computer and the mobile telephone signal processing circuit 306 in the case where the Personal computer performs data communications or the like by way of the later-explained mobile telephone network 103. Note that its coupling with the vehicle-mounted type information terminal 200 is carried out also by way of the I/F connector 312.

Figure 5:
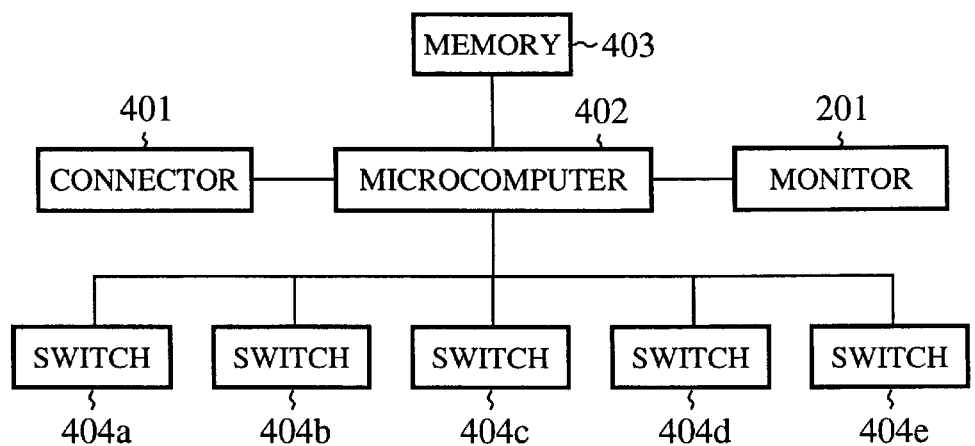
FIG. 5 is a schematic diagram showing the inner construction of the vehicle-mounted type information terminal within the mobile terminal device.

Next, the inner construction of the vehicle-mounted type information terminal 200 is shown in FIG. 5. In the figure, numeral 401 denotes a connector for connecting the vehicle-mounted type information terminal 200 and the portable telephone 210, numeral 402 denotes a microcomputer, 403 denotes a memory which is connected to the microcomputer 402 and stores data. Numerals 404a, 404b, 404c, 404d and 404e denote switches, each of which operates in connection with the operation of the corresponding one of arrows (↑, →, ↓, ←) indicated on the operation buttons, or operation of the center portion thereof (the portion indicated by □).

The operation of the navigation system according to the first embodiment is now explained as below.

Figure 6:
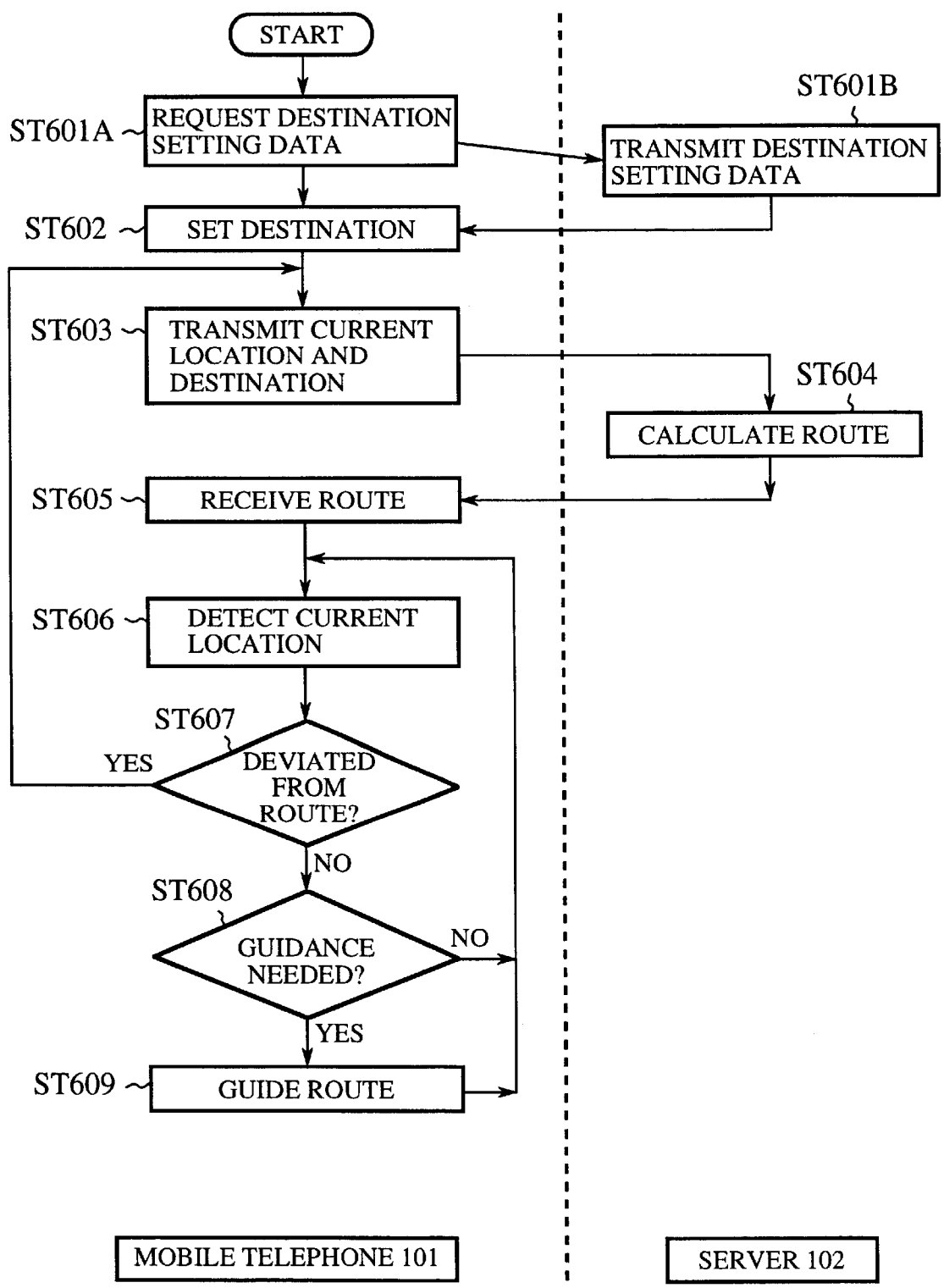
FIG. 6 is a flowchart showing the operation of the navigation system of the present invention.

Here, FIG. 6 is a flowchart showing the operation of the navigation system shown in FIGS. 3 to 5, wherein the left half of the illustration indicates the process operated in the mobile terminal 101, whereas the right half indicates the process in the server 102. FIG. 7 is an illustration explaining sequentially the variation of displayed images on the monitor 201 of the vehicle-mounted type information terminal 200 when the system is operated in accordance with the above flowchart. Here, all the displayed examples show the case where it is used in the United States just for convenience.

FIG. 7(a) shows an initial image displayed on the monitor 201 of the vehicle-mounted type information terminal 200. In this State, selection can be done; by depressing one of the arrows of the operation button 202 to move the cursor within the monitor device to select either one of "Enroute" (for shifting the displayed image to the one for setting the route detection) or "Audio" (for shifting the displayed image to the one for setting the audio function), and thereafter, selection is completed by depressing the center portion of the corresponding operation button 202 (the portion indicated by □).

Here, let us assume that "Enroute" is selected. Since the audio function is not related to the present invention, the explanation thereabout is omitted here. However, it can be readily imagined that the microcomputer 402 displays an image on the monitor 201 prompting the user's operation, so that it controls various audio-related units (not shown), which are preinstalled in or connected to the vehicle-mounted type information terminal 200.

When "Enroute" is selected, first the microcomputer 402 of the vehicle-mounted type information terminal 200 tries to obtain destination setting data for setting the destination from the server 102 in steps ST601A and ST601B. In other words, in step ST601A, the microcomputer 402 dials the preset number of the server 102, and instructs the portable telephone 210 to enable a data communications. When the telephone line is connected, the microcomputer 402 requests a transmission of the destination setting data to the sever 102 by way of the portable telephone 210, the mobile telephone network 103 and the telephone network 104. On receiving this request, the server 102 transmits the destination setting data to the telephone network 104 in step ST601B. This destination setting data is transmitted from the telephone network 104 to the vehicle-mounted type information terminal 200 by way of the portable telephone network 103 and the portable telephone 210, and is finally input to the microcomputer 402 through the connector 401. On receiving this destination setting data, the microcomputer 402 specifies in step ST602 a destination through communication with the user as explained hereinafter.

FIGS. 7(b) and 7(c) are displayed images for indicating in which part of the United States the destination exists. First, as shown in FIG. 7(b), the user is required to select an initial letter of the name of a target State. Thereafter, the user moves the cursor by operating the operation button 202 of the vehicle-mounted type information terminal 200 so as to specify the above-mentioned initial letter. Here, the letter "M" is selected.

Once the initial letter is confirmed, the image displayed on the monitor 201 of the vehicle-mounted type information terminal 200 will be changed to the one as shown in FIG. 7(c). In the same figure, names of eight States beginning with letter "M" within the whole America are listed and displayed on the monitor 201. Note that although only four names are listed in FIG. 7(c), by depressing the arrows (↑, ↓) of the operation button 202, the cursor is shifted upward and downward to scroll the State names, and by further depressing these arrows even after it has reached the uppermost or lowermost portions, the names of all these eight States can be displayed. The user can specify the name of a desired State by depressing this operation button 202, referring to the image displayed on the monitor 201. Here, "Michigan" State is selected.

When "Michigan" is selected, a city or a county therein is specified next. FIGS. 7(d) and 7(e) are images displayed for specifying a city or a county within Michigan State. Specifying one of these cities and counties is also carried out by the same manner as that for specifying one of the States. In other words, in FIG. 7(d), the user selects the initial letter for one city or one county. Here, the letter "D" has been selected. Thereafter, as shown in FIG. 7(e), cities and counties whose names begin with "D" are all listed. Although approximately 20 cities and counties beginning with letter "D" exist in Michigan State, "Detroit" city has been selected here.

When the name "Detroit" is selected, then an image as shown in FIG. 7(f) is displayed on the monitor 201, and selection of the type of destination is solicited. The user selects one of the destination categories from the group of "Airport", "Hospital", "Station", "Museum", "Bank" and "Shopping". Here, "Airport" is selected.

When "Airport" is selected, then an image as shown in FIG. 7 (g) is displayed, and names of eleven airports within or in the suburbs of Detroit City are listed. The user selects the name of the destination (name of the airport). Here, "Detroit City Airport" is selected.

As explained above, the fact that all the selections ranging from that of the initial letter of one State to that of the name of the destination are transmitted sequentially from the server 102 corresponds to the "destination setting information transmission means" defined in claim 8.

By the above-explained communications between the mobile terminal 100 and the server 102, the destination is determined as "Detroit City Airport". This "name of the destination" corresponds to the "destination information" defined in claim 2. When the destination is once determined, the image displayed on the monitor 201 is changed to the one as shown in FIG. 7(h), and thereafter the user is solicited to select either calculation of the distance between the starting point and the destination, setting of further destinations, or canceling the thus determined destination. In the image displayed on the monitor as shown in FIG. 7(h), by depressing the arrows (→, ←) in the operation button 202, the cursor can be shifted to the point of the mark 203 shown in the same figure. This mark 203 indicates going back to the previous image.

When the center portion of the operation button 202 (the portion indicated by □) is depressed with the cursor being at "cancel enroute", the destination obtained by the operations performed heretofore can be cancelled, and the displayed image will go back to the one as shown in FIG. 7(a).

When the center portion of the operation button 202 (the portion indicated by □) is depressed with the cursor being at "Add next destination", the displayed image will go back to the one as shown in FIG. 7(b), so that the second destination can be set by the same method as explained heretofore.

When the center portion of the operation button 202 (the portion indicated by □) is depressed with the cursor being at "Yes", the procedure advances to step ST603. In this step ST603, first the microcomputer 402 of the vehicle-mounted type information terminal 200 stores a plurality of destinations determined by the above-mentioned operations and/or communications in the memory 403, and thereafter, the microcomputer 402 requests a transmission of the location information to the location calculating circuit 303 of the portable telephone 210. The location calculating circuit 303 receives the whole time signals from the GPS satellite when in operation, and whenever it receives signals from the GPS satellite, it extracts the position of itself as the value of the latitude and longitude thereof. The location calculating circuit 303 transmits the latest location information among all the already-extracted location information in response to the request from the above-mentioned microcomputer 402. This "location information" corresponds to the "location information of itself" defined in claim 2.

The microcomputer 402 that has received the location information transmits the thus received location information and the above-mentioned one or more destination names (Detroit City airport, Detroit, Michigan) to the server 102. This transmission of the location information and the determined destination names made by the microcomputer 402 corresponds to the "transmission means" defined in claim 2.

Figure 8:
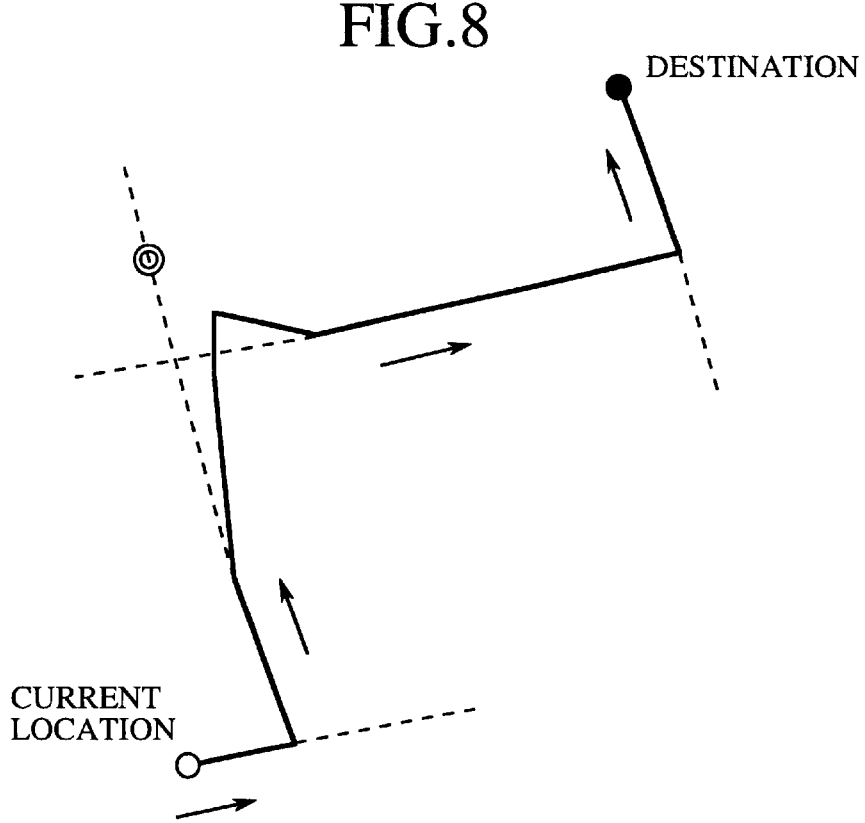
FIG. 8 is an illustration showing an exemplary case of a route map extracted by the navigation system of the present invention.

Thereafter, the procedure advances to step ST604, and the server 102 that has received these location information and the destination names from the microcomputer 402 specifies as to whether or not the locations of these are within the road network, referring to the map database 105. Further, the server 102 extracts an optimal route from the road network connecting these two points. Since many optimal route extracting methods have already been proposed, the detailed explanation thereabout is omitted here. Note that this "optimal route" and its extracting method correspond to the "recommendable travelling route" and the "route extracting means" defined in claim 8. FIG. 8 shows one example of the extracted route map.

The server 102 transmits an extracted optimal route to the mobile terminal 101 together with the name of the road. The transmission of the this route from the server 102 to the mobile terminal 101 corresponds to the "transmission means" as defined in claims 8 and 9. One example of the signal mode of the transmission signal transmitted from the server 102 to the mobile terminal 101 is shown below.

<!DocType Route> ... ①
<!Contents Start> ... ②
<location N0421952 E0825733, Direction 300> ... ③
(crossing N0421955 E0825728, IN-Direction 120, EX Direction 30 Name Interstate R75, Other Roads Direction 300> ... ④
<corner N0421960 E0825730, In-Direction 240, EX-Direction 10> ... ⑤
<point N0421961 E0825731> ... ⑥
<crossing N0421970 E0825735, IN-Direction 200, EX Direction 0 Name Interstate R94, Other-Roads-Direction 10> ... ④
<crossing N0421975 E0825725, IN-Direction 120, EX Direction 40 Name Outer Corner, Other-Roads-Direction 220> ... ④
<destination N0421977 E0825727> ... ⑦
<!contents end> ... ⑧

In the above signal mode, numeral ① declares that the following description relates to a route. Numeral ② indicates that the route data starts here and are sequentially described. Numeral ③ indicates the present location and the direction in which the user should take. Numeral ④ indicates the location of a crossing, entering angle into and leaving angle from the crossing, the road name, angle of other roads with respect to the crossing. Numeral ⑤ indicates the location of a point, which is curved but not a crossing, and the entering and leaving angles. Numeral ⑥ indicates a point on the road. Numeral ⑦ indicates the location of the user's destination. Note that in the case where there are a plurality of destinations, ④ to ⑦ are further described after the description of ⑦. Numeral ⑧ indicates that the description of the route data is finished. Here, the location is indicated by the north latitude and the east longitude, and angles are measured in a counter clockwise direction starting from the North as "0" degree. In other words, by travelling along the route as indicated from ③ to ⑦, the user can reach his destination.

Note that the "transmitted signal" in this signal mode corresponds to the "first information" defined in each claim. Note also that in the example shown here, the route extracted from the above-mentioned explanation of the destination and the location information is not shown.

Thereafter, the procedure advances to step ST605, wherein the route data transmitted from the server 102 as shown above are received by the portable telephone 210 by way of the telephone network 104 and the mobile telephone network 103. In the portable telephone 210, the above route data is received by the antenna 304, and is transmitted to the vehicle-mounted type information terminal 200 by way of the portable telephone high-frequency circuit 305, the portable telephone signal processing circuit 306, the I/F circuit 311 and the I/F connector 312. In the vehicle-mounted type information terminal 200, this route data is received by the microcomputer 402 and stored in the memory 403. In this way, the procedure from receiving the "route data" by the antenna 304 to storing it in the memory 403 corresponds to the "receiving means" in each claim, and specifically the procedure for storing the "route data" into the memory 403 corresponds to the "storage means" defined in claim 5.

Next in step ST606, the microcomputer 402 detects its current location by the same procedure as that in step ST603. Normally, since the procedures from step ST603 to step ST606 are carried out very quickly, the current location information transmitted from the mobile terminal 101 in step ST603 and the current location information at the beginning stage of step ST606 are not very different from each other.

In other words, the current location substantially coincides with the position indicated by ③ of the above route data.

In the next step ST607, the deviation between the present location and the line made by sequentially connecting each of the points indicated by the route data (guide route) is evaluated. This evaluation of deviation corresponds to the "comparing means" defined in each claim. In the case where there is a deviation of, for example, more than 100 meters (hereinafter referred to just as "100 m"), the mobile terminal 101 is judged to be deviated from the extracted route, and the procedure goes back to step ST603, whereas in the case where the deviation is less than 100 m, then the mobile terminal 101 is judged to be on the extracted route, and the procedure then advances to step ST608. Now at this very moment, it can be judged to be on the route, so that the procedure advances to step ST608.

In step ST608, it is determined as to whether the user is approaching to the point described in the route data. This determination is settled depending on whether the distance between the current location described in ③ of the route data and the location described immediately after ③ of the route data is within 300 m, in the case where 300 m is the judging threshold. If the distance from the present location to the point described after ③ of the route data is more than 300 m, then there is no need to provide specific information such as a crossing or the like, so that the user is instructed to go along the current route by way of the image displayed as shown in FIG. 7(i). The procedure returns to step ST606 after the image shown in FIG. 7(i) is displayed.

Let us assume that now the user goes along the current route for a while, and has come to the point within 300 m from the point described immediately after ③. In this case, it is first detected in step ST608. When it is detected that the user has come to the point within 300m from the point described immediately after ③, the procedure advances to step ST609 from step ST608. In step ST609, an image as shown in FIG. 7(j) is displayed on the monitor 201 so as to instruct the user as to how he should go across the crossing, and how the road to which the user should not go further is related to the crossing and so on in accordance with the described content of the route data. Note that this "image display" corresponds to the "indication means" defined in each claim. The user recognizes his route with reference to this displayed image. In this example, the user recognizes that he should turn right. Thereafter, the procedure goes back to step ST606, and the procedures from step ST606 to step ST608, or the procedures from step ST606 to step ST609 are repetitively executed. Due to this, appropriate route guidance is provided to the user.

When the user reaches his destination by the procedures above, the name of the corresponding destination is deleted. If a plurality of destinations are stored in the memory 403, and there is a next destination at this stage, then the procedure goes back to step ST606, and repeats the route guidance to the next destination.

Here, let us assume that the mobile terminal 101 has erroneously come to the point indicated by the mark "⊙" as shown in FIG. 8, and in step ST607, it is judged that the current location has deviated away for more than 100 m from the guided route (hereinafter referred to just as the "guide route"). In this case, the microcomputer 402 specifies the nearest point from the current location on the guide route indicated by a solid line as shown in FIG. 8. Then, the microcomputer 402 specifies the direction toward the above-specified point observed from the current location, and displays an image as shown in FIG. 7(k) on the monitor 201 in order to inform the user that he has deviated from the guide route, and also indicate him the direction in which the nearest point of the guide route resides. The indication of this deviation from the guide route and the direction to the nearest point of the guide route corresponds to the "return indication means" defined in claim 3. Note that in FIG. 7(k), the cursor is already set to the "enRoute" as a default value. If the center portion of the operation button 202 (the portion indicated by □) is depressed in this state, the procedure goes back to step ST603.

The location calculating circuit 303 transmits the latest one of the location information already extracted, in response to the request from the microcomputer 402. The microcomputer 402 that has received this location information transmits the corresponding location information and the above-mentioned one or more than one destination names such as (Detroit City Airport, Detroit, Michigan) to the server 102. Note that the transmission of this location information and the destination names to the server 102 corresponds to the "new route requesting means" defined in each claim.

Thereafter in step ST604, the server 102 that has received this location information and the destination name extracts an optimal route from the both information. This "route" information corresponds to the "second information" defined in each claim. The route thus extracted in this way is transmitted from the server 102 to the mobile terminal 101. In other words, the user can obtain the route data from the current location which has deviated from the route indicated by the mark "○" to the previously set destination indicated by the mark "●", so that the user can shift his location naturally to the destination without halting its movement.

Figure 9:
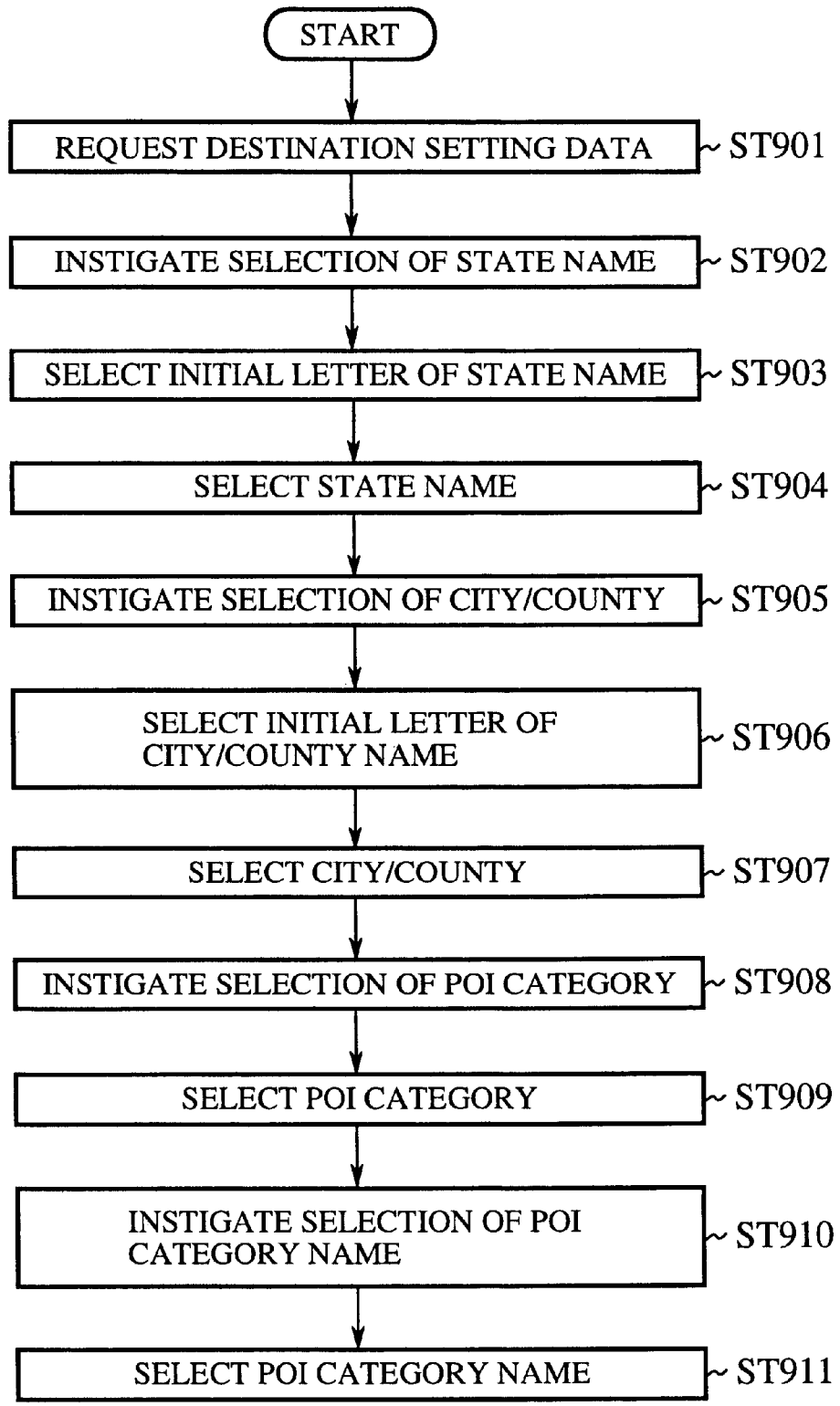
FIG. 9 is a flowchart showing in details the important portion of the operation of the navigation system according to a first embodiment of the present invention.

Next, the procedure for determining the destination conducted in steps ST601A to step ST602 shown in FIG. 6 is now explained as below. Note that FIG. 9 is a flowchart showing the procedures conducted in these steps ST601A to step ST602 into details.

When "Enroute" is selected on the monitor display shown in FIG. 7(a), the mobile terminal 101 requests a transmission of the destination setting data in step ST901 to the server 102. The server 102 that has received this request transmits a list of the State names to the mobile terminal 101 and instigates the user to select one of the State names in step ST902. Here, we can assume that the amount of data is less than 1 Kbytes.

When the mobile terminal 101 receives this instruction, the user is instigated to select the initial letter of a State using the image displayed in FIG. 7(b) in step ST903. Thereafter, in step ST904, the user is instigated to select the name of the thus selected State by use of the image displayed in FIG. 7(c) to specify one State in which his destination resides. Since the meaning of the displayed image, and the operation to be done by the user at this stage have already been explained before, a detailed explanation thereabout is omitted here. The thus specified name of the State is sent back to the server 102 from the mobile terminal 101.

Next, in step ST905, the server 102 that has received the sent-back State name transmits a list of the names of Cities or Counties within the thus selected State so as to instruct to select the name of a City or a County. The amount of this data can be deduced to be approximately 1 Kbytes. When the mobile terminal 101 receives this data, it displays an image as shown in FIG. 7(d) in step ST906, and in step ST907, an image as shown in FIG. 7(e) is displayed to instigate the user to specify a City or a County in which his destination resides. The name of the City or the County thus specified in this way is transmitted to the server 102.

Next, the server 102 transmits a list of the POI (Point of Interest) categories to the mobile terminal 101 to instigate the user to select one of the POI categories in step ST908. The amount of this data can be deduced to be approximately 100 Bytes. The mobile terminal 101 that has received this data provides in step ST909, a list of the POI categories thus sent in FIG. 7(*f*) to the user so as to instigate him to select one of the categories of the POI categories. The POI category thus selected is transmitted to the server 102.

The server that has received the POI category transmits a list of the POI names of the selected POI category residing within the specified City or County in step ST910 to instigate the user to select one of the POI names. The amount of this data can be deduced to be less than 100 Bytes. The mobile terminal 101 that has received the list provides the thus sent list of the POI names to the user as shown in FIG. 7(*g*) so as to instigate him to select one of the POI names as his destination in step ST911. As explained above, transmission of the selection candidates sequentially from the stage for selecting the initial letter of one State to the stage for selecting the POI name corresponds to the "destination setting information transmission means" defined in claim 8.

The POI name selected in accordance with the above method is transmitted to the server 102, and is referred therein together with the name of the selected State and that of the City or County, so as to be provided for calculation of the route in step ST604.

As explained above, in the destination setting process, since the storing capacity of the data transmitted from the server 102 to the mobile terminal 101 is no more than 1 Kbytes, if the memory 403 has a capacity just enough to cope with it, there will be no need to increase its capacity, so that it can be realized without requiring an increase in the memory capacity.

As explained above, according to this first embodiment, since the navigation function can be attained only by communicating with the server 102 at the initial State of the route guidance and at the timing where the mobile terminal 101 has deviated from the route, the navigation function can be performed with a minimum frequency of communications between the mobile terminal 101 and the server 102, wherein the terminal 101 is not equipped with a map data such as a CD-ROM and so on.

Further, according to this first embodiment, since the server 101 has also sent the several spots byway of which the vehicle travels, when the server 102 is made to calculate the route, these spots can be set, and since the direction to the nearest guide route is indicated even when the vehicle has deviated from the route, returning to the guide route is made possible, and further, since the server 102 contains the destination setting data in a layered form, the memory capacity required for setting the destination can be made small, so that the size of the vehicle-mounted type information terminal 200 can be minimized as a whole, yet keeping the easy-to-use characteristic for the user.

[Second Embodiment]

Next, second embodiment of the present invention is now explained as below.

In the navigation system according to the first embodiment, even in the case where the location of the vehicle itself is deviated from the guide route, no more than the direction for the vehicle to return to the guide route as shown in FIG. 7(*k*) is shown, and as to how the user can return to the guide route is not explained at all. Thus, when an image of FIG. 7(*k*) is displayed in such cases, the user is forced to select "enRoute". The navigation system of the second embodiment relates to an improvement in the method for coping with the case in which the vehicle location has deviated from the guide route.

Figure 10:
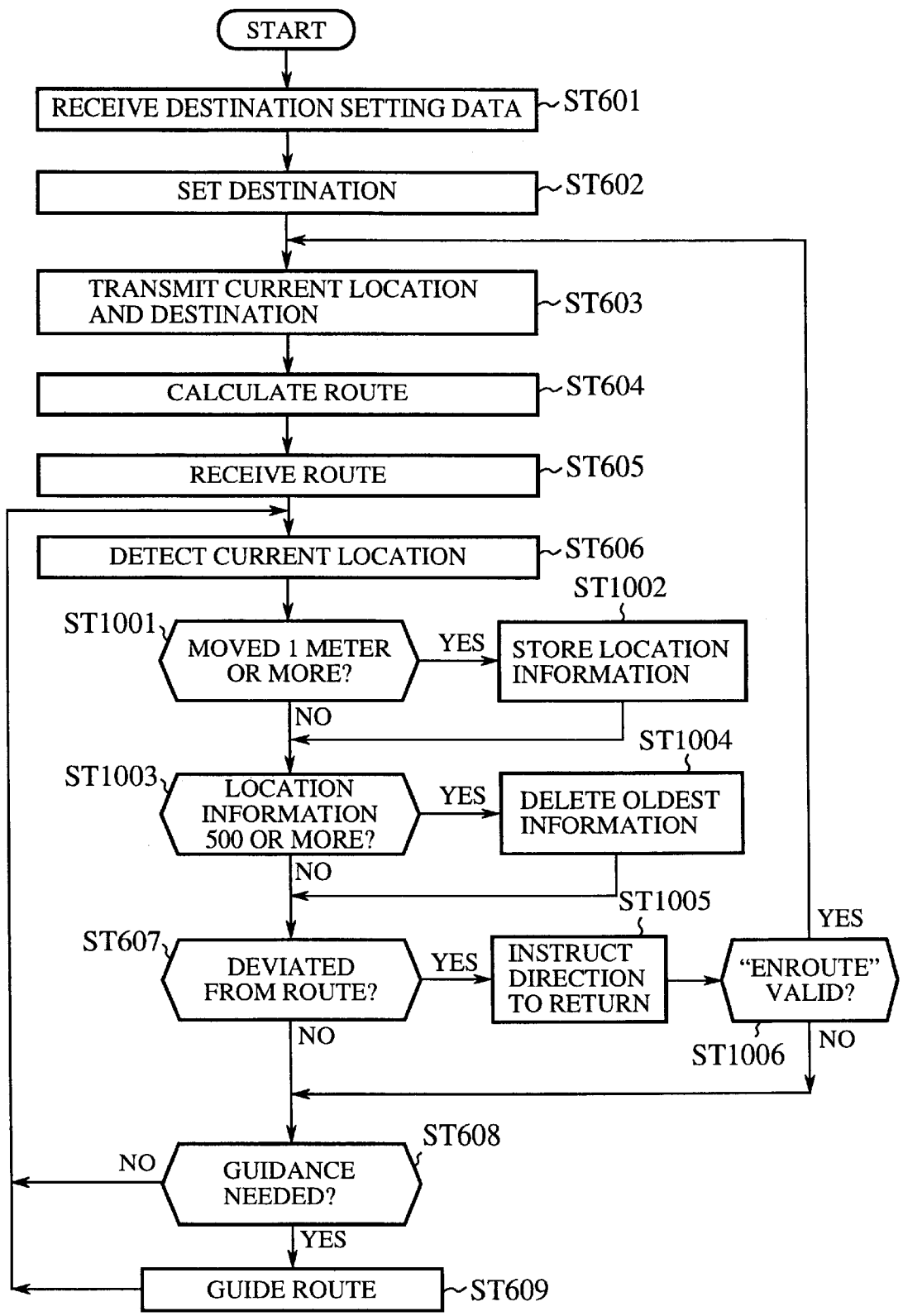
FIG. 10 is a flowchart showing the operation of the navigation system according to a second embodiment of the present invention.

Here, FIG. 10 is a flowchart showing the flow of the operation of the navigation system of this second embodiment, wherein the steps ST606 to ST609 shown in FIG. 6 have been improved. Note that in this FIG. 10, the steps corresponding to each step in FIG. 6 are provided with the same reference numbers, and the steps corresponding to those in steps ST601A and ST601B are put together and defined as step ST601.

First in steps ST601 to ST606, when the current location is detected in the same way as that of the first embodiment, the procedure advances to step ST1001. In this step ST1001, it is judged whether the current location has been shifted for more than 1 m from the previous timing at which the current location was stored, and if it is judged to have shifted for more than 1 meter, then the procedure is branched to step ST1002, whereas if not, the procedure advances to step ST1003. In step ST1002, after the microcomputer 402 stores the current location, the procedure advances to step ST1003. In step ST1003, it is detected whether the location information stored by the execution of step ST1002 is more than 500.

As a result, if the location information stored is more than 500, the procedure is branched to step ST1004, whereas if less than 500, the procedure advances to step ST607. In step ST1004, the oldest data is deleted, and the number of location information stored is limited to 500, and thereafter the procedure advances to step ST607. In step ST607, not only the deviation from the route is detected, but also the position at which that deviation from the route occurred is speculated, just as the case of the first embodiment. It is to be noted that the speculation of the deviated point is carried out by tracking back the stored location information for 100 meters from the location at which the deviation was judged.

Figure 11A:
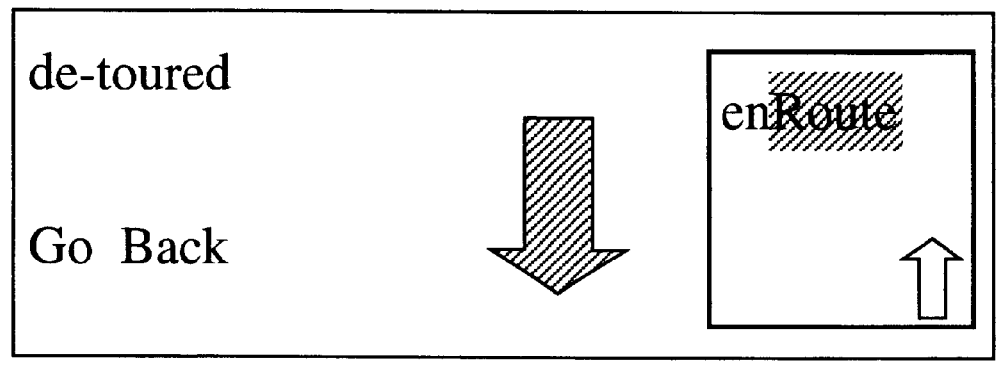
FIG. 11 is an illustration showing the important portion of the image display in its operating mode.
Figure 11B:
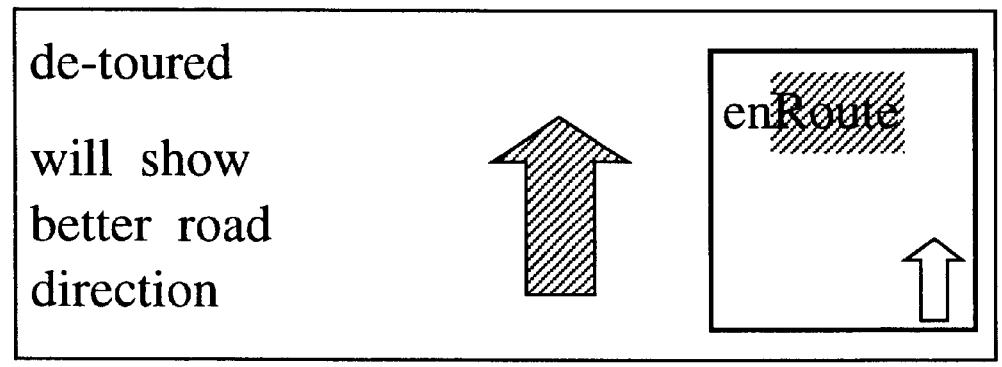

As a result of the judgment, in the case where the deviation from the route has been detected, an image as shown in FIG. 11(*a*) is displayed in step ST1005, and the user is instructed to go back the same route as that he had come. Thereafter in step ST1006, it is judged whether the center portion of the operation button 202 (the portion indicated by □) has been depressed in order to make the "en Route" effective, and if it is judged that it has been depressed, the procedure goes back to step ST603, whereas if it is judged that it ha s not been depressed, then the procedure goes to step ST1005 by way of steps ST608, ST606, ST1001, ST1002, ST1003, ST1004 and ST607.

Figure 12:
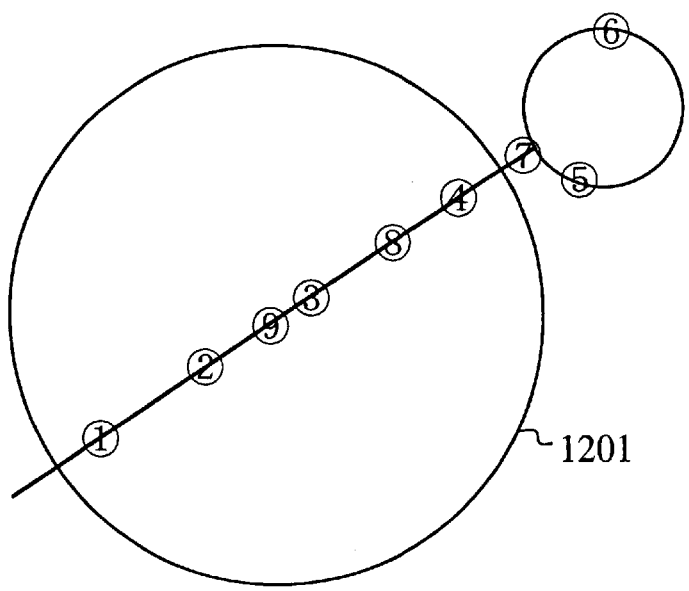
FIG. 12 is an illustration explaining a return to the guide route according to the second embodiment of the present invention.

Here, FIG. 12 shows an imaginary circle 1201 with a diameter of, for example, 50 m centering around the current location 9. In this state, in the case where two groups out of the location in formation ① to ⑨; namely the group consisting of the location information ① to ④ and the other group consisting the location information ⑧ and ⑨ are included in the circle 1201, whereas another group sandwiched by these two groups; namely the group consisting of ⑤ to ⑦ is excluded from the circle 1201, it can be judged that the vehicle is going back the same route in the opposite direction by a U-turn driving or the like.

Thereafter, the direction indicated by a vector connecting the location information, which is included in the older group of information (① to ④)) and indicating the nearest position ③ to the current position, and the location information indicting the position ② which is one step older than this position ③ is displayed as shown in FIG. 11(*b*). The displayed direction indicates the direction of the route directing the above-mentioned speculated deviated point. Note that to indicate the returning direction to the guide route corresponds to the "return indication means" defined in claim 4.

The above explanation has been explained as to the case in which the number of location information to be stored is limited to 500. However, it will be better to have larger number within the limit of the capacity of the memory 403 allowed, as the return route can be indicated even if the user has deviated too far, increasing thereby the easy-to-use characteristic for of the user. Further, it goes without saying that in the case where an image displayed as shown in FIG. 11(*b*) is started, the easy-to-use characteristic for the user is increased if the stored location information is provided.

As explained heretofore, according to the second embodiment of the present invention, when the location of the vehicle is deviated from the guide route, it is arranged such that the user is guided to travel in the opposite direction after the deviation, so that even when the user has deviated from the guide route, he can go back to the guide route without requesting a new route detection. Thus, the frequency of communications can further be reduced.

[Third Embodiment]

The navigation system according to a third embodiment of the present invention is now explained as below.

The navigation system according to this third embodiment is the one for coping with the case in which the amount of route data transmitted from the server 102 in step ST605 in the first embodiment exceeds the capacity of the memory 403 provided in the information terminal 200.

Figure 13:
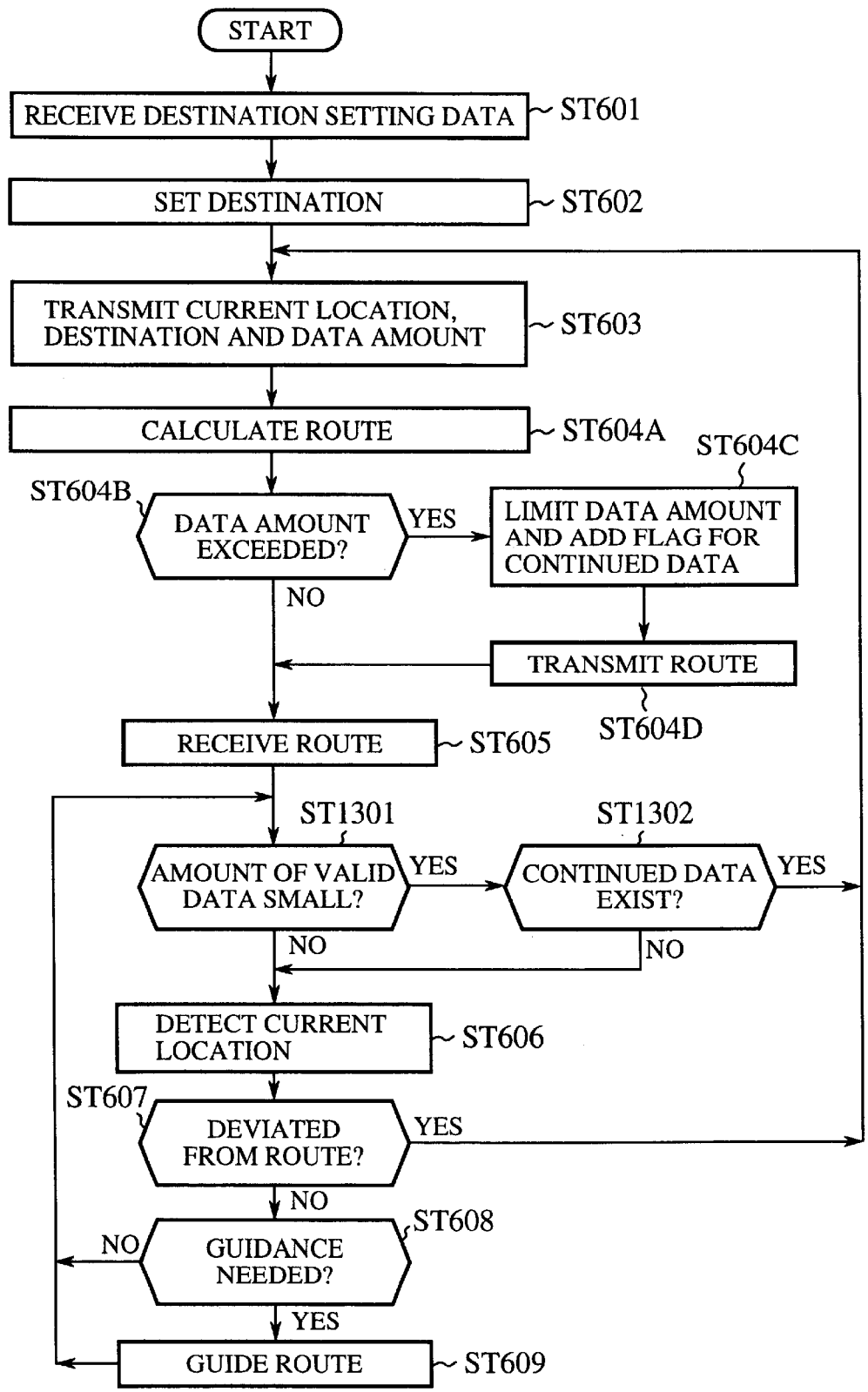
FIG. 13 is a flowchart showing the operation of the navigation system according to a third embodiment of the present invention.

Here, FIG. 13 is a flowchart showing the operation of the navigation system according to a third embodiment of the present invention. Note that in this figure, the steps corresponding to each step shown in FIG. 6 are provided with the same numerals, wherein the steps corresponding to steps ST601A and ST601B are put together to step ST601, and the step ST604 is divided onto 4 steps; namely, steps ST604A, ST604B, ST604C and ST604D.

When the destination is specified in steps ST601 and ST602 by the same procedures as those in the first embodiment, the procedure advances to step ST603. In this step ST603, the current location information, the spots by way of which the vehicle travels, and the name of the destination are transmitted to the server 102 in the first embodiment. However, in this third embodiment, the capacity of the memory 403 that can be used for storing data is also transmitted to the sever 102 in addition to the above data. In other words, the capacity of the memory 403 usable for storing data is informed to the server 102 as the data amount MDL which is desired to be transmitted from the server 102. Here, this data amount MDL is assumed to be 100 Kbytes. Note that to inform the data amount desired to be transmitted to the server 102 corresponds to the "data amount informing means" defined in claim 6.

The server 102 receives a request for transmission of the destination setting data from the mobile terminal 101 and the data amount MDL. Note that the reception of this data amount MDL corresponds to the "condition receiving means" defined in claim 9.

Next, in step ST604A, the server 102 makes the route calculation just like the first embodiment. Note that this calculation of the route corresponds to the "processing means" defined in claim 9. Thereafter, in step ST604B, the data amount of the extracted recommendable travelling route RDL is compared with the data amount MDL informed in step ST603. As a result, if the extracted data amount RDL is 80 Kbytes, which is smaller the informed data amount MDL 100 Kbytes, then the procedure advances to step ST605.

On the other hand, if the extracted data amount RDL is 150 Kbytes, which is greater than the informed data amount MDL 100 Kbytes, then the procedure advances to step ST604C, and cuts the route data at about the 99$^{th}$ Kbytes from the start point of the route data, so that the data amount MDL becomes less than 100 Kbytes. This cutting of the route data for making the data amount MDL less than 100 Kbytes corresponds to the "data amount limiting means" defined in claim 9. Here, in the case where the route data is cut, the data indicating that there are still other data following thereto is added. This addition of data indicating that there is a continuation of data thereafter corresponds to the "continued information adding means" defined in claim 9. The following shows an example of a signal mode near the end of the route data transmitted from the server 102.

<Crossing N0421970 E0825735, IN-Direction 200, EX Direction 0 Name Interstate R94, Other-Roads-Direction 10> . . . ④-1

<Crossing N0421975 E0825725, IN-Direction 120, EX Direction 40 Name Other Corner, Other-Roads-Direction 2200> . . . ④-2

<Contents Continued> . . . ⑨

<!contents end> . . . . ⑧

Note that in the signal mode shown here, the extracted route data is cut before ⑨, and it is informed that there is further data continuing after ⑨.

Thereafter, in step ST604D, the route data is cut so that the data amount becomes less than the data amount MDL, and the route data to which the data 9 indicating that there is further data continuing thereafter is added is transmitted to the mobile terminal 101, and thereafter the procedure goes to step ST605. In step ST605, the above data transmitted from the server 102 is received by the mobile terminal 101 just as the case of the first embodiment.

Next, in step ST1301, the later-explained valid data amount within the memory 403 is determined. However, let us assume that at this stage, the residual amount of route data is still plenty. In this case, just like the case of the first embodiment, the user can be guided by sequentially executing the image displays shown in FIG. 7.

Here, let us assume that the user is travelling in accordance with the guidance, and has approached to the point just before 300 m in front of the point indicated by ④-2. At this stage, only the above route data ④-2, ⑨ and ⑧ have been stored in the memory 403 as valid route data, whereas other route data are not required. The microcomputer 402 determines the amount of the valid data within the memory 403 in step ST301, and this determination of the amount of valid data corresponds to the "memory monitoring means" defined in claim 5.

As a result of the determination, in the case where there is very little valid data left in the memory 403, the procedure branches to step ST1302, whereas it goes to step ST606 otherwise. In step ST1302, the microcomputer 402 judges whether there is data ⑨ near the end portion of the route data. If, as a result, it is judged that there is data ⑨, the microcomputer 402 sets the procedure back to step ST603, and tries to obtain the route data from the current location to the destination from the server 102. Note that to obtain the rout data from the server 102 corresponds to the "continued data requesting means" defined in claim 5. On the other hand, if it is judged that there is no corresponding data left, the procedure goes to step ST606.

Thereafter, in steps ST606 to ST609, the same procedures as those in the first embodiment are performed.

As explained heretofore, according to this third embodiment, with the data amount being preliminarily informed to the server 102, in the case where the amount of the route data extracted in step ST102 is greater than the capacity of the memory 403, then the route data is transmitted separately, so that an overflow of the memory 403 can be automatically prevented, and thus the user can be guided to the destination even without causing any inconvenience to him.

[Fourth Embodiment]

Next, the fourth embodiment of the present invention is now explained as below.

The navigation system of this fourth embodiment also relates to the method of coping with the case where the amount of the route data sent from the server 102 exceeds the capacity of the memory 403 provided in the information terminal 200 in step ST605 in the first embodiment. However, the method for avoiding this problem is different from that of the third embodiment.

Figure 14:
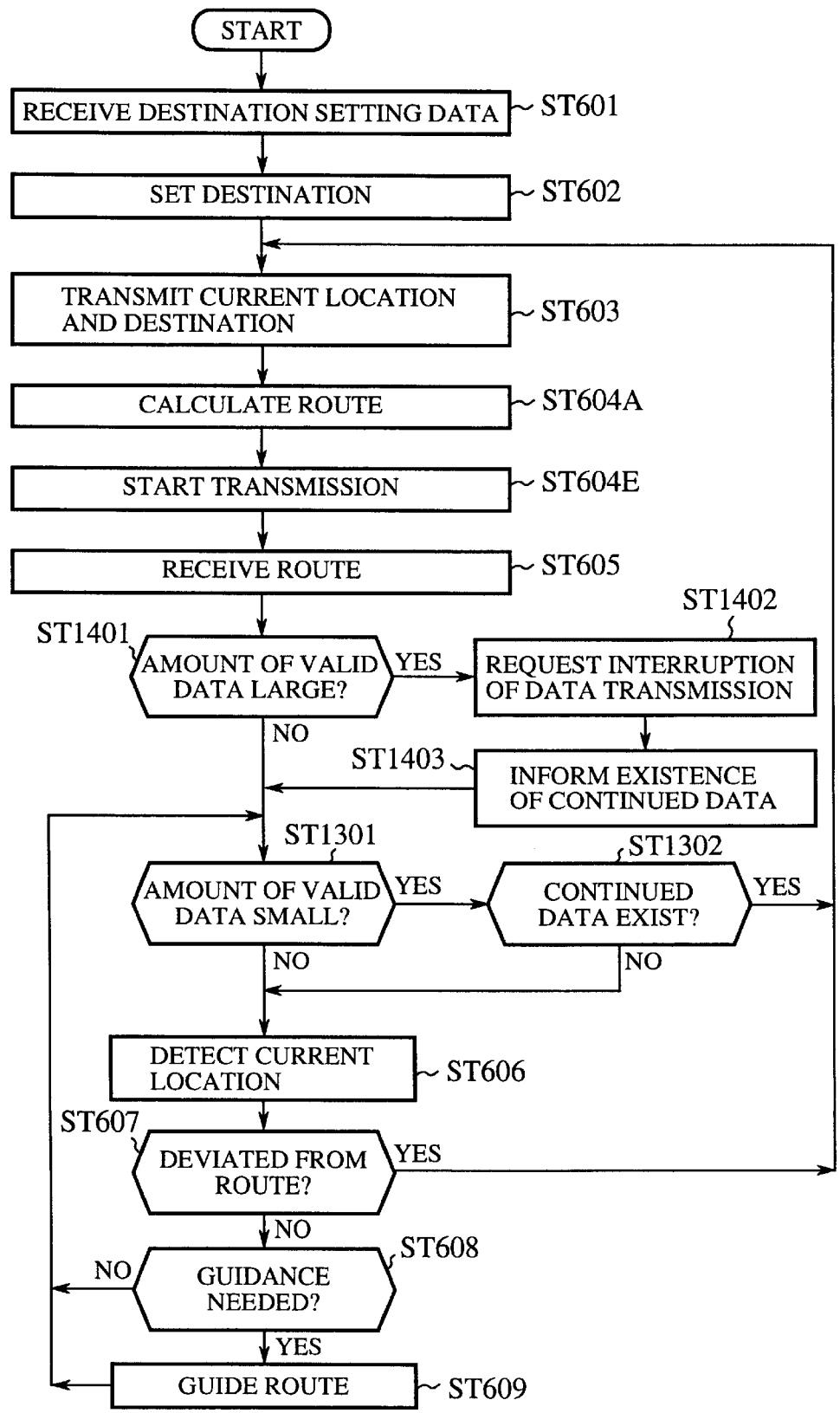
FIG. 14 is a flowchart showing the operation of the navigation system according to a fourth embodiment of the present invention.

Here, FIG. 14 is a flowchart showing the operation of the navigation system of this fourth embodiment. Note that in this FIG. 14, the steps corresponding to each step in FIG. 13 are provided with the same reference numbers, and the steps ST604B to ST604D are replaced by step ST604.

The procedure advances just as the first embodiment, and the server 102 carries out a rout calculation and extracts a recommendable travelling route in step ST604A. Then, in step ST604E, transmission of the route data to the mobile terminal 101 starts. The microcomputer 302 of the mobile terminal 101 starts receiving the route data in step ST605, and stores sequentially the thus received data in the memory 403.

Thereafter in step ST1401, the microcomputer 402 monitors the occupation rate of the memory 403 during the storing operation of the received route data therein, and when there is not much capacity left in the memory 403, the procedure branches to step ST1402. On the other hand, if the reception of the route data is terminated even when there is more capacity left, then the procedure advances directly to step ST1301.

In step ST1402, the mobile terminal 101 requests the server 102 for an interruption of the route data transmission, and simultaneously stops writing of the route data into the memory 403. Note that this request for an interruption of the route data corresponds to the "interruption requesting means" in claim 7. Next in step ST1403, the microcomputer adds to the end portion of the route data stored in the memory 403 the data ⑨ indicating that there is a continuation of data, and the data 8 indicating that the description of the route data is terminated, and thereafter the procedure goes to step ST1301.

Note that the operation performed after step ST1301 is same as that of the third embodiment, so that the detailed explanation thereof is omitted here.

As explained heretofore, even by this fourth embodiment, an overflow of the memory 403 can be automatically prevented by monitoring the occupation rate thereof, and interrupting the writing operation into the memory 403 before the memory being saturated, so that the destination can be guided even without causing any inconvenience to the user.

[Fifth Embodiment]

Note that the first to fourth embodiments have been explained as to the case where the destination and the spots by way of which the vehicle travels are stored in the microcomputer 402. However, these pieces of information may be stored in the server 102 side, and it can be readily deduced that the same effects as those obtained by each of the above embodiments can be obtained. In this case, such an effect as reducing the load on the microcomputer 402 can also be obtained.

[Sixth Embodiment]

Further, the first embodiment has been explained as to the case where a so-called turn-by-turn method for displaying images as shown in FIGS. 7(j) and 7(k) is employed as the method for providing the navigation function to users. However, in the case where the microcomputer 402 has such a function as voice synthesizing and so on, a route guiding to the user by a human voice is also made possible.

[Seventh Embodiment]

Further, the first embodiment has been explained as to the case where a so-called turn-by-turn method for displaying images as shown in FIGS. 7(j) and 7(k) is explained as the method for providing a navigation function to users. However, in the case where the upper limit of the communication speed of the mobile telephone network 103 or the like is high, the microcomputer 402 is equipped with a memory 403 of a substantial memory capacity, and where the monitor 201 can display a TV image, data including the roads around the guide route can also be transmitted to the user from the server 102, and even a map can be provided to the user.

[Eighth Embodiment]

Further, the first embodiment has been explained as to the case where a method of sequential selection is employed as the destination setting method for selecting the destination. However, it is widely known to specify a destination by telephone numbers as swell. In other words, the user can select his destination not only by the method of sequential selection as explained in the first embodiment, but can also simplify the selection by an input of a telephone number or the like. In this case, all the procedures for setting the destination as indicated in step ST601A, wherein a request for transmission of destination setting data to the server 102, and receiving thereafter the data thus transmitted from the server 102 in accordance with the image displayed as shown in FIGS. 7(b) to 7(g), can be obviated.

As explained heretofore, the navigation system according to the present invention implements a navigation system more suitable for its mobile use, which can obviate a CD-ROM for storing a map database as has been required at the mobile terminal side for realizing the navigation function, or can omit at least a mechanism section for reproducing the CD-ROM, making the mobile terminal thus small in size, and reducing the consumption of electric power. Further, it can implement the navigation system of a quite convenient on-demand type capable of realizing the navigation function by a minimum communication frequency and minimum memory capacity, limiting the communications between the mobile terminal and the server only to the initial state of the route guidance and the timing when a deviation from the route has occurred, lowering thereby the communication fee, and minimizing the power consumption, and also capable of indicating the information by which the user can readily reach his destination even in the case of deviation from the route.

What is claimed is:

1. A mobile terminal in a navigation system, which carries out communications by way of a communication channel and provides a route guidance for users on the basis of the data obtained by the communications, said mobile terminal comprising:

location detection means for detecting the location of the mobile terminal itself, receiving means for receiving a first recommendable traveling route data transmitted by way of said communication channel as a first information, said route data covering a first condition based on the starting point data and the destination data of itself, comparing means for comparing said first recommendable traveling route data with a location detected by said location detection means, indication means for indicating a direction to which the user should move on the basis of the result of the comparison made by said comparing means, and new route requesting means for transmitting a request for a new second recommendable traveling route data to said communication channel on the basis of the result of the comparison, said second recommendable traveling route data covering a second condition based on the location of the mobile terminal itself detected by said location detection means and said destination data, wherein said receiving means receives said new second recommendable traveling route data transmitted by way of said communication channel as a second information, and said comparing means also compares said second recommendable traveling route data with a location detected by said location detection means.

2. The mobile terminal in a navigation system according to claim 1 further comprising transmission means for transmitting the location information and the destination information of itself to the communication channel as a first condition.

3. The mobile terminal in a navigation system according to claim 1 further comprising return indication means, which, in the case where a deviation of its location from the recommendable traveling route is detected on the basis of the result of the comparison conducted in said comparing means, indicates the direction in which the nearest recommendable traveling route resides to the user.

4. The mobile terminal in a navigation system according to claim 1 further comprising return indication means, which, in the case where a deviation of its location from the recommendable traveling route is detected on the basis of the result of the comparison conducted in said comparing means, indicates the direction reverse to the recommendable traveling route after the deviation to the user.

5. The mobile terminal in a navigation system according to claim 1 further comprising;

storage means for storing the data received through the communication channel into a memory, processing means for sequentially processing the data received through said communication channel, memory monitoring means for monitoring as to whether or not the summed amount of the memory area which has been made available after the completion of processing conducted by said processing means and unused memory area is substantially great, and continued data requesting means, which, in the case where the result of the monitoring is substantially great and it is indicated that the received data contains a continued data, transmits a request for transmission of said continued data to said communication channel.

6. The mobile terminal in a navigation system according to claim 5 further comprising data amount informing means for transmitting a notification of the amount of data storable in the memory to the communication channel, in advance of receiving data by way of the communication channel.

7. The mobile terminal in a navigation system according to claim 5 further comprising interruption requesting means, which, in the case where the result of the monitoring conducted by said memory monitoring means has become small during the data reception by way of the communication channel, transmits a request for interruption of the data transmission to the communication channel.

8. A server in a navigation system, which comprises a map database, and transmits data for providing a route guidance for users on the basis of said map database by the communications conducted by way of a communication channel, said sever comprising:

request receiving means for receiving the starting point information and the destination information of itself transmitted by way of said communication channel as a condition, route extracting means for extracting a recommendable traveling route by referring to said map database in accordance with the condition received by said request receiving means, transmission means for transmitting the recommendable traveling route extracted by said route extracting means by way of said communication channel, and destination setting information transmission means for transmitting destination setting information to said communication channel in the order of upper to lower layers, in response to the request received by way of said communication channel.

9. The server in a navigation system according to claim 8, further comprising:

condition receiving means for receiving the condition for data transmission and a data-storage use memory amount data, both transmitted through the communication channel, processing means for carrying out processing on the basis of the condition for data transmission, transmission means for transmitting the result of the processing conducted by said processing means, data amount limiting means for limiting the amount of data transmitted from said transmission means to the level below said data storage-use memory amount data, and continued information adding means for adding the information indicating that there exists continued data to the data transmitted to said communication channel.

10. The mobile terminal in a navigation system according to claim 1 further comprising a wireless telephone line as the communication channel.

11. The server in a navigation system according to claim 8 further comprising a wireless telephone line as the communication channel.

12. In a position response route display system wherein a selected route and associated map data are downloaded from a remote location over a communications channel, a method of displaying a desired route and map data juxtaposed to the selected route, comprising:

a) detecting a position within recorded map data;

b) setting a destination location;

c) receiving traveling route data from a communications channel based on starting point data and destination point data, wherein the route data defines a travel route within said map data;

d) comparing the position of step a) to the traveling route data; and e) indicating a direction to which the user should move on the basis of the result of the said comparison means.

13. A position responsive route display system wherein a selected route and associated map data are downloaded from a remote location over a communications channel, comprising:

a detector detecting a position within recorded map data;

an input enabling user setting a destination location;

a receiver receiving traveling route data from a communications channel based on starting point data and destination point data, wherein the route data defines a travel route within said map data;

a processor comparing the position detected by the detector to the traveling route data received by the receiver; and a display indicating a direction to which the user should move on the basis of the result of the said comparison means.

14. A position responsive route display system wherein a selected route and associated map data are downloaded from a remote location over a communications channel comprising:

a receiver downloading data representative of the selected route and map data associated therewith to a route display system memory from the remote location;

a computer computing a current location with the route data to determine a position with respect to the route ; and a route display system displaying directions to a user based on a result from the computer.

15. In a position response route display system wherein a selected route and associated map data are downloaded from a remote location over a communications channel, a method of displaying a desired route and map data juxtaposed to the selected route, comprising:

a) downloading data representative of the selected route and map data associated therewith to a route display system memory from the remote location;

b) computing a current location with the route data to determine a position with respect to the route;

c) providing directions to the user based on a result of step b); and d) when the current position falls outside the map data downloaded in said step a), updating the map data around the current position.

16. In a position response route display system wherein a selected route and associated map data are downloaded from a remote location over a communications channel, a method of displaying a desired route and map data juxtaposed to the selected route, comprising:

a) downloading data representative of the selected route and map data associated therewith to a route display system memory from the remote location;

b) computing a current location with the route data to determine a position with respect to the route;

c) providing directions to the user based on a result of step b); and d) when the current position varies from the selected route, updating the route and downloading additional map data juxtaposed to the updated route and not already present in the display system memory.

* * * * *